(12) United States Patent
Nihei et al.

(10) Patent No.: US 6,998,223 B1
(45) Date of Patent: *Feb. 14, 2006

(54) OPTICAL WAVELENGTH CONVERTING DEVICE AND PROCESS FOR PRODUCING THE SAME

(75) Inventors: Yasukazu Nihei, Kaisei-machi (JP); Masayuki Naya, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 216 days.

This patent is subject to a terminal disclaimer.

(21) Appl. No.: 09/649,013

(22) Filed: Aug. 28, 2000

(30) Foreign Application Priority Data

Aug. 27, 1999 (JP) .............................. 1999/241062
Oct. 15, 1999 (JP) .............................. 1999/293802

(51) Int. Cl.
*G02F 1/37* (2006.01)

(52) U.S. Cl. .................. 430/321; 430/312; 385/2; 385/5; 385/129; 385/122

(58) Field of Classification Search ................ 385/2, 385/5, 129, 122; 430/321, 312
See application file for complete search history.

(56) References Cited

U.S. PATENT DOCUMENTS

| | | | | |
|---|---|---|---|---|
| 3,615,470 A | * | 10/1971 | Singletary ..................... | 355/1 |
| 4,006,438 A | * | 2/1977 | Bennett ......................... | 333/72 |
| 4,564,576 A | * | 1/1986 | Saigo et al. ................... | 430/296 |
| 4,707,059 A | * | 11/1987 | Ogura et al. .................. | 350/96.13 |
| 4,799,750 A | * | 1/1989 | Miyawaki et al. ............ | 350/96.13 |
| 5,131,068 A | * | 7/1992 | Kanarian et al. ............. | 385/122 |
| 5,384,464 A | * | 1/1995 | DeFornel et al. ............. | 250/492.2 |
| 5,568,308 A | * | 10/1996 | Harada ........................... | 385/122 |
| 5,594,746 A | | 1/1997 | Harada ........................... | 372/22 |
| 6,013,221 A | * | 1/2000 | Byer et al. ..................... | 264/436 |
| 6,198,197 B1 | * | 3/2001 | Yamaouchi et al. ......... | 310/313 R |
| 6,344,367 B1 | * | 2/2002 | Naya et al. .................... | 438/32 |
| 6,497,996 B1 | * | 12/2002 | Naya et al. .................... | 430/323 |

FOREIGN PATENT DOCUMENTS

| | | | |
|---|---|---|---|
| JP | 4-335620 | | 11/1992 |
| JP | 06-027671 | * | 2/1994 |
| JP | 06-043655 | * | 2/1994 |
| JP | 06-095385 | * | 4/1994 |

(Continued)

OTHER PUBLICATIONS

Elliott, D.J., "Integrated Circuit Fabrication Technology", (1982), pp. 188-191.*

(Continued)

*Primary Examiner*—Martin Angebranndt
(74) *Attorney, Agent, or Firm*—Sughrue Mion, PLLC

(57) ABSTRACT

A photosensitive resist layer is formed on one surface of a single-polarized ferroelectric substance having nonlinear optical effects. The resist layer has properties such that, when light is irradiated to the resist layer, only exposed areas of the resist layer or only unexposed areas of the resist layer become soluble in a developing solvent. The resist layer is then exposed to near-field light in a periodic pattern with a device, which receives exposure light and produces the near-field light in the periodic pattern. The resist layer is then developed to form a periodic pattern. A periodic electrode is then formed on the one surface of the ferroelectric substance by utilizing the periodic pattern of the resist layer as a mask, the periodic electrode being formed at positions corresponding to opening areas of the mask. An electric field is applied across the ferroelectric substance by utilizing the periodic electrode to set regions of the ferroelectric substance, which stand facing the periodic electrode, as domain inversion regions.

11 Claims, 5 Drawing Sheets

FOREIGN PATENT DOCUMENTS

| | | | |
|---|---|---|---|
| JP | 06-202338 | * | 7/1994 |
| JP | 7-72521 | | 3/1995 |
| JP | 07-114188 | * | 5/1995 |
| JP | 08-179493 | * | 7/1996 |
| JP | 10-170966 | | 6/1998 |
| JP | 2000-221685 | * | 8/2000 |
| JP | 2002-020224 | * | 1/2002 |
| WO | 99/15933 | * | 4/1999 |

OTHER PUBLICATIONS

Thompson, L.F., et al., "Introduction to Microlithography", pp. 288-335 (1983).*
Patent Abstract of Japan 4335620 A Nov. 24, 1992.
Patent Abstract of Japan 10170966 Jun. 26, 1998.

* cited by examiner

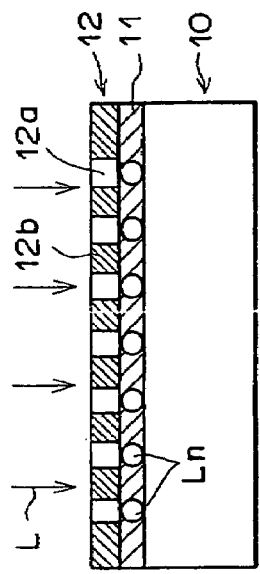
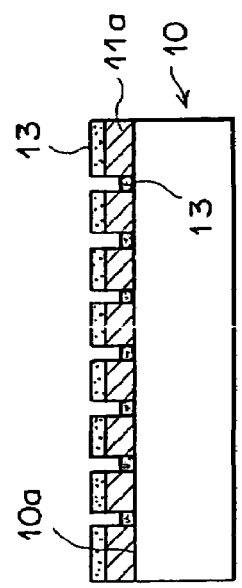
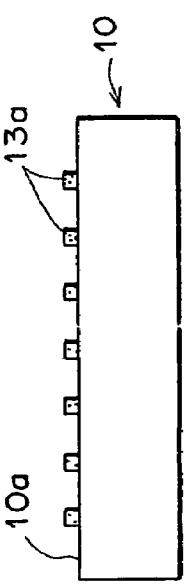
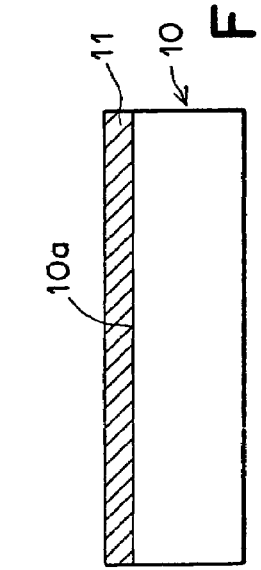
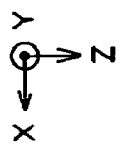

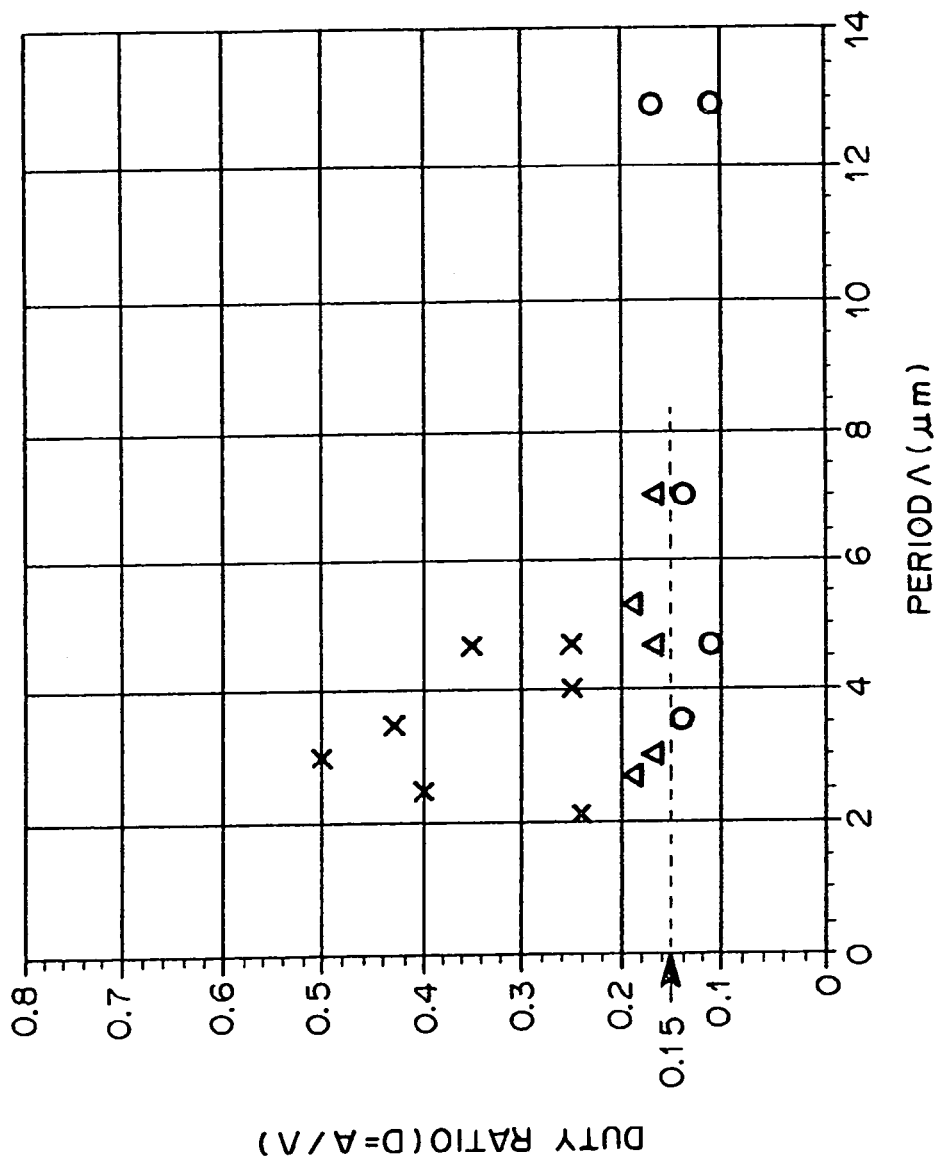

OPTICAL WAVELENGTH CONVERTING DEVICE AND PROCESS FOR PRODUCING THE SAME

BACKGROUND OF THE INVENTION

1. Field of the Invention

This invention relates to an optical wavelength converting device for converting a fundamental wave into its second harmonic, or the like. This invention particularly relates to an optical wavelength converting device having a periodic domain inversion structure. This invention also relates to a process for producing the optical wavelength converting device. This invention further relates to a solid laser for converting a produced laser beam into its second harmonic by the utilization of the optical wavelength converting device and radiating out the second harmonic.

2. Description of the Related Art

A technique, wherein a fundamental wave is converted into its second harmonic by the utilization of an optical wavelength converting device having a periodic domain inversion structure, has been proposed by Bleombergen, et al. in Phys. Rev., Vol. 127, No. 6, 1918 (1962). The periodic domain inversion structure is provided with regions, in which spontaneous polarization (domain) of a ferroelectric substance having nonlinear optical effects is inverted periodically. With the proposed technique, phase matching between a fundamental wave and its second harmonic can be effected by setting such that a period $\Lambda$ of the domain inversion regions may be integral multiples of a coherence length $\Lambda C$, which may be represented by Formula (1) shown below.

$$\Lambda c = 2\pi / \{\beta(2\omega) - 2\beta(\omega)\} \quad (1)$$

in which $\beta(2\omega)$ represents the propagation constant of the second harmonic, and $\beta(\omega)$ represents the propagation constant of the fundamental wave.

In cases where wavelength conversion is performed by using a bulk crystal of a nonlinear optical material, the wavelength at which the phase matching is effected is limited to a specific wavelength that is inherent to the crystal. However, with the proposed technique, the phase matching can be effected efficiently by selecting the period $\Lambda$ of the domain inversion regions, which period satisfies Formula (1), with respect to an arbitrary wavelength.

One of techniques for forming the periodic domain inversion structure described above has been proposed in, for example, Japanese Unexamined Patent Publication No. 7(1995)-72521. With the proposed technique for forming the periodic domain inversion structure, after a periodic electrode in a predetermined pattern is formed on one surface of a single-polarized ferroelectric substance having nonlinear optical effects, an electric field is applied through corona charge across the ferroelectric substance by the utilization of the periodic electrode and a corona wire, which is located on the surface side of the ferroelectric substance opposite to the one surface of the ferroelectric substance, and regions of the ferroelectric substance which stand facing the periodic electrode are thereby set as local area limited domain inversion regions.

A different technique for forming the periodic domain inversion structure described above has been proposed in, for example, Japanese Unexamined Patent Publication No. 4(1992)-335620. With the proposed technique for forming the periodic domain inversion structure, an entire-area electrode is formed on a surface of a ferroelectric substance on the side opposite to a surface on which a periodic electrode in a predetermined pattern is formed, an electric field is applied across the ferroelectric substance by the utilization of the entire-area electrode and the periodic electrode, and local area limited domain inversion regions are thereby formed.

As a technique for forming the periodic electrode, a technique, wherein ridge regions having predetermined shapes in a predetermined pattern are formed on one surface of a ferroelectric substance, and electrode fingers of a periodic electrode are formed on the surfaces of the ridge regions, has been proposed in, for example, Japanese Unexamined Patent Publication No. 10(1998)-170966.

In cases where the periodic domain inversion structure is formed by the utilization of the periodic electrode in the manner described above, particularly as for a Z-cut ferroelectric substance plate, there is a strong possibility that, as the period of the periodic electrode is set to be short in order for a second harmonic, or the like, having a short wavelength to be generated, domain inversion regions, which are adjacent to each other and extend through the ferroelectric substance from the areas corresponding to electrode fingers of the periodic electrode, will become connected with each other.

The problems described above will be described hereinbelow with reference to FIG. 7. FIG. 7 is a graph showing results of evaluation of periodicity of various bulk-form periodic domain inversion structures, each of which is formed in LiNbO$_3$ doped with MgO (hereinbelow referred to simply as MgO—LN) by the utilization of a periodic electrode having an electrode line width (i.e., the line width of each of the electrode fingers of the periodic electrode) A, the evaluation being made with respect to various different values of a period $\Lambda$ of domain inversion regions and various different values of a duty ratio D (D=A/$\Lambda$). In FIG. 7, the "○" mark indicates that the periodicity is good over a length of at least 1 mm. The "$\Delta$" mark indicates that the periodicity is good only over a length of less than 1 mm or that the regions in which the periodicity is good occur sporadically. The "X" mark indicates that few regions in which the periodicity is good occur.

As shown in FIG. 7, in order for good periodicity of the periodic domain inversion structure to be obtained, it is efficient to set the duty ratio D at a small value, i.e. to set the electrode line width A at a small value. Also, in cases where the period $\Lambda$ of the domain inversion regions is at most 7 $\mu$m, it is necessary for the duty ratio D to be set at a value of at most 0.15. In cases where the domain inversion length is approximately 1 mm, the duty ratio D should thus be set at a value of at most 0.15. In the cases of large areas (in cases where the domain inversion length is approximately 3 mm to 4 mm), such that the inversion periodicity may be enhanced, the duty ratio D should be set at a value smaller than the value of at most 0.15.

In cases where the periodic domain inversion structure is formed by the utilization of the periodic electrode, each of the domain inversion regions is formed over a region slightly wider than the region corresponding to the electrode line width A due to the spread of the electric field. Therefore, even if the duty ratio D is set at a value smaller than 0.15, the periodic domain inversion structure can be formed, in which the ratio between the width of each domain inversion region and the width of each non-inversion region is approximately equal to 1:1.

In view of the above circumstances, in cases where a second harmonic, or the like, having a short wavelength falling within, for example, the blue region or the ultraviolet region is to be generated, it is necessary for a periodic electrode having a markedly small electrode line width A to be formed. However, heretofore, it was difficult to form a periodic electrode having a markedly small electrode line width A. Particularly, with respect to the optical wavelength converting device in which the periodic domain inversion structure is formed in the bulk form in a crystal of a Z-cut plate of MgO—LN, an example in which a second harmonic having a wavelength falling within the wavelength region of at most 470 nm has not heretofore been reported. The term "periodic domain inversion structure in a bulk form in a crystal of a Z-cut plate" as used herein means the periodic domain inversion structure in which the domain inversion regions are formed over a range extending from a position in the vicinity of a +Z surface of the plate to a position in the vicinity of a −Z surface of the plate.

In cases where a second harmonic having a wavelength falling within the wavelength region of at most 470 nm is to be generated with the aforesaid type of the optical wavelength converting device, if the electrode line width A of the periodic electrode employed for the formation of the periodic domain inversion structure is set at a value of at most 0.3 μm, a periodic domain inversion structure reliably having good periodicity over a wide area can be formed.

As techniques for forming a periodic electrode having a small electrode line width A, an EB drawing technique, a FIB deposition technique, and the like, have heretofore been known. However, the conventional techniques for forming a periodic electrode having a small electrode line width A are not appropriate for large-area patterning and have a low throughput and a productivity markedly lower than the level of productivity required for mass production.

As a technique capable of coping with large-area patterning, a technique utilizing a contraction exposure apparatus has heretofore been known. However, the technique utilizing the contraction exposure apparatus has the drawbacks in that the cost of the contraction exposure apparatus is markedly high and it is difficult to obtain an electrode line width A shorter than the wavelength of exposure light.

SUMMARY OF THE INVENTION

The primary object of the present invention is to provide a process for producing an optical wavelength converting device, wherein a periodic electrode having a markedly small electrode line width is capable of being formed, and a bulk-form periodic domain inversion structure, in which domain inversion regions are formed with a markedly short period that has heretofore been impossible, is thereby capable of being formed.

Another object of the present invention is to provide an optical wavelength converting device having a bulk-form periodic domain inversion structure, in which domain inversion regions are formed with a markedly short period that has heretofore been impossible.

A further object of the present invention is to provide a solid laser, wherein the optical wavelength converting device is utilized, a produced laser beam is capable of being converted into its second harmonic having a markedly short wavelength, and the second harmonic is radiated out from the solid laser.

The present invention provides a first process for producing an optical wavelength converting device having a periodic domain inversion structure, in which a periodic electrode is formed on one surface of a single-polarized ferroelectric substance having nonlinear optical effects, and an electric field is applied across the ferroelectric substance by the utilization of the periodic electrode in order to set regions of the ferroelectric substance, which stand facing the periodic electrode, as local area limited domain inversion regions, the process comprising the steps of:

i) forming a photosensitive resist layer on the one surface of the ferroelectric substance, the resist layer having properties such that, when light is irradiated to the resist layer, only exposed areas of the resist layer or only unexposed areas of the resist layer become soluble in a developing solvent, ii) exposing the resist layer to near-field light in a periodic pattern with means, which receives exposure light and produces the near-field light in the periodic pattern, iii) developing the resist layer, which has been exposed to the near-field light, to form a periodic pattern in the resist layer, and iv) forming the periodic electrode on the one surface of the ferroelectric substance by utilizing the periodic pattern of the resist layer as a mask, the periodic electrode being formed at positions corresponding to opening areas of the mask.

The present invention also provides a second process for producing an optical wavelength converting device having a periodic domain inversion structure, in which a periodic electrode is formed on one surface of a single-polarized ferroelectric substance having nonlinear optical effects, and an electric field is applied across the ferroelectric substance by the utilization of the periodic electrode in order to set regions of the ferroelectric substance, which stand facing the periodic electrode, as local area limited domain inversion regions, the process comprising the steps of:

i) forming an electrode material layer on the one surface of the ferroelectric substance, ii) forming a photosensitive resist layer on the electrode material layer, the resist layer having properties such that, when light is irradiated to the resist layer, only exposed areas of the resist layer or only unexposed areas of the resist layer become soluble in a developing solvent, iii) exposing the resist layer to near-field light in a periodic pattern with means, which receives exposure light and produces the near-field light in the periodic pattern, iv) developing the resist layer, which has been exposed to the near-field light, to form a periodic pattern in the resist layer, and v) etching the electrode material layer by utilizing the periodic pattern of the resist layer as an etching mask, such that portions of the electrode material layer at positions corresponding to opening areas of the mask are removed by the etching, whereby the periodic electrode is formed.

The present invention further provides a third process for producing an optical wavelength converting device having a periodic domain inversion structure, in which a periodic electrode is formed on one surface of a single-polarized ferroelectric substance having nonlinear optical effects, and an electric field is applied across the ferroelectric substance by the utilization of the periodic electrode in order to set regions of the ferroelectric substance, which stand facing the periodic electrode, as local area limited domain inversion regions, the process comprising the steps of:

i) forming a first resist layer and a second resist layer in this order on the one surface of the ferroelectric substance, the first resist layer being removable by etching, the second resist layer being photosensitive and having properties such that, when light is irradiated to the second resist layer, only exposed areas of the second resist layer or only unexposed areas of the second resist layer become soluble in a developing solvent, ii) exposing the second resist layer to near-field light in a periodic pattern with means, which receives exposure light and produces the near-field light in the periodic pattern, iii) developing the second resist layer, which has been exposed to the near-field light, to form a periodic pattern in the second resist layer, iv) etching the first resist layer by utilizing the periodic pattern of the second resist layer as an etching mask to form a periodic pattern composed of the first resist layer and the second resist layer, and v) forming the periodic electrode on the one surface of the ferroelectric substance by utilizing the periodic pattern, which is composed of the first resist layer and the second resist layer, as a mask, the periodic electrode being formed at positions corresponding to opening areas of the mask.

The present invention still further provides a fourth process for producing an optical wavelength converting device having a periodic domain inversion structure, in which a periodic electrode is formed on one surface of a single-polarized ferroelectric substance having nonlinear optical effects, and an electric field is applied across the ferroelectric substance by the utilization of the periodic electrode in order to set regions of the ferroelectric substance, which stand facing the periodic electrode, as local area limited domain inversion regions, the process comprising the steps of:

i) forming an electrode material layer on the one surface of the ferroelectric substance, ii) forming a first resist layer and a second resist layer in this order on the electrode material layer, the first resist layer being removable by etching, the second resist layer being photosensitive and having properties such that, when light is irradiated to the second resist layer, only exposed areas of the second resist layer or only unexposed areas of the second resist layer become soluble in a developing solvent, iii) exposing the second resist layer to near-field light in a periodic pattern with means, which receives exposure light and produces the near-field light in the periodic pattern, iv) developing the second resist layer, which has been exposed to the near-field light, to form a periodic pattern in the second resist layer, v) etching the first resist layer by utilizing the periodic pattern of the second resist layer as an etching mask to form a periodic pattern composed of the first resist layer and the second resist layer, and vi) etching the electrode material layer by utilizing the periodic pattern, which is composed of the first resist layer and the second resist layer, as an etching mask, such that portions of the electrode material layer at positions corresponding to opening areas of the mask are removed by the etching, whereby the periodic electrode is formed.

In the third and fourth processes for producing an optical wavelength converting device in accordance with the present invention, the second resist layer should preferably have a film thickness of at most 100 nm. Also, the third and fourth processes for producing an optical wavelength converting device in accordance with the present invention should preferably be modified such that the first resist layer is formed from a non-photosensitive material, and the etching performed for the first resist layer is dry etching.

In the first, second, third, and fourth processes for producing an optical wavelength converting device in accordance with the present invention, the exposure light should preferably have a wavelength falling within the range of 250 nm to 450 nm.

Also, the first, second, third, and fourth processes for producing an optical wavelength converting device in accordance with the present invention should preferably be modified such that the means, which receives the exposure light and produces the near-field light in the periodic pattern, is a mask comprising a light-transmitting member, which is capable of transmitting the exposure light, and a metal pattern, which has opening areas and is formed on the light-transmitting member, the near-field light being radiated out from the metal pattern, and the mask comprising the light-transmitting member and the metal pattern is located such that the metal pattern is in close contact with the resist layer, which is laid bare on the ferroelectric substance, or the metal pattern is located close to the resist layer, which is laid bare on the ferroelectric substance, such that the near-field light reaches the resist layer, which is laid bare on the ferroelectric substance, the exposure light being irradiated to the mask comprising the light-transmitting member and the metal pattern in this state.

Further, the first, second, third, and fourth processes for producing an optical wavelength converting device in accordance with the present invention should preferably be modified such that the means, which receives the exposure light and produces the near-field light in the periodic pattern, is an optical stamp constituted of a light-transmitting member, which is capable of transmitting the exposure light and has a concavity-convexity pattern formed on one surface, the optical stamp operating such that, when the exposure light is guided from within the light-transmitting member to the one surface of the light-transmitting member and is caused to undergo total reflection, the near-field light in a pattern in accordance with the concavity-convexity pattern formed on the one surface of the light-transmitting member is radiated out, and the optical stamp is located such that the one surface of the optical stamp provided with the concavity-convexity pattern is in close contact with the resist layer, which is laid bare on the ferroelectric substance, or the one surface of the optical stamp provided with the concavity-convexity pattern is located close to the resist layer, which is laid bare on the ferroelectric substance, such that the near-field light reaches the resist layer, which is laid bare on the ferroelectric substance, the exposure light being irradiated to the optical stamp in this state.

Furthermore, the first, second, third, and fourth processes for producing an optical wavelength converting device in accordance with the present invention should preferably be modified such that the means, which receives the exposure light and produces the near-field light in the periodic pattern, is a probe provided with an opening having a diameter shorter than a wavelength of the exposure light, the probe being caused to scan on the resist layer, which is laid bare on the ferroelectric substance, the exposure light being irradiated to the probe in this state.

Also, in the first, second, third, and fourth processes for producing an optical wavelength converting device in accordance with the present invention, the ferroelectric substance should preferably be $LiNbO_3$ doped with MgO (MgO—LN). In such cases, the periodic electrode should preferably have an electrode line width of at most 0.3 $\mu$m.

The present invention also provides a first optical wavelength converting device, comprising a crystal of a Z-cut plate of $LiNbO_3$ doped with MgO, domain inversion regions being formed periodically in a bulk form in the crystal, wherein the domain inversion regions are formed with a period falling within the range of 1.0 μm to 4.6 μm.

The present invention further provides a second optical wavelength converting device, comprising a crystal of a Z-cut plate of $LiNbO_3$ doped with MgO, domain inversion regions being formed periodically in a bulk form in the crystal, wherein the optical wavelength converting device is constituted to radiate out a wavelength-converted wave having a wavelength falling within the range of 320 nm to 470 nm.

The present invention still further provides a third optical wavelength converting device, comprising a crystal of a Z-cut plate of $LiNbO_3$ doped with MgO, domain inversion regions being formed periodically in a bulk form in the crystal, wherein the domain inversion regions are formed with a period falling within the range of 1.0 μm to 4.6 μm, and the optical wavelength converting device is constituted such that, when a fundamental wave having a wavelength falling within the range of 640 nm to 940 nm impinges upon the optical wavelength converting device, the optical wavelength converting device radiates out a second harmonic having a wavelength falling within the range of 320 nm to 470 nm with the period of the domain inversion regions acting as a first-order period for pseudo-phase matching.

The present invention also provides a solid laser, comprising the first, second, or third optical wavelength converting device in accordance with the present invention, the solid laser being constituted to covert a produced laser beam into its second harmonic and to radiate out the second harmonic.

With the processes for producing an optical wavelength converting device in accordance with the present invention, the photosensitive resist is exposed to the near-field light, which oozes from the periodic pattern having a line width shorter than the wavelength of the exposure light, and the exposed resist is then developed. Therefore, a periodic electrode having an electrode line width of at most 100 nm, i.e. a period of at most 200 nm, can be formed. Thus a periodic electrode having a short electrode line width, which was impossible with conventional lithography, can be obtained.

Specifically, in cases where the periodic electrode is formed on the one surface of the ferroelectric substance by utilizing the periodic pattern of the resist layer as a mask, the periodic electrode being formed at the positions corresponding to the opening areas of the mask, the line width of each of the opening areas of the mask may be set at a value of at most 100 nm.

In cases where the electrode material layer is formed on the one surface of the ferroelectric substance, the electrode material layer is etched by utilizing the periodic pattern of the resist layer as the etching mask, such that the portions of the electrode material layer at the positions corresponding to the opening areas of the mask are removed by the etching, and the periodic electrode is thereby formed, the line width of each of the areas other than the opening areas of the mask (i.e., the line width of each of the areas remaining as the resist layer) may be set at a value of at most 100 nm.

With the third and fourth processes for producing an optical wavelength converting device in accordance with the present invention, wherein the double-layered resist comprising the first resist layer and the second resist layer is employed, in cases where the ferroelectric substance has a step-like area and an area, to which the near-field light cannot reach if only one resist layer is formed, occurs, the first resist layer can act to form a flat surface, and therefore the film thickness of the second resist, which is photosensitive and is formed on the first resist layer, can be uniformized. Accordingly, the near-field light can be radiated out uniformly even in a large-area pattern, and a fine pattern of the second resist layer, which is photosensitive, can be formed. The first resist layer is then patterned with a conventional etching technique by utilizing the pattern of the photosensitive second resist layer as the mask. In this manner, a fine pattern can be formed easily and at a low cost.

With the processes for producing an optical wavelength converting device in accordance with the present invention, wherein the mask provided with the metal pattern or the optical stamp provided with the concavity-convexity pattern is employed as the means, which receives the exposure light and produces the near-field light in the periodic pattern, the advantages over the scanning exposure can be obtained in that the exposure of a large-area periodic pattern can be performed instantaneously, and therefore the optical wavelength converting device can be produced with a high throughput and at a low cost.

With the processes for producing an optical wavelength converting device in accordance with the present invention, wherein the periodic electrode having a markedly small line width is capable of being formed in the manner described above, the optical wavelength converting device comprising a crystal of a Z-cut plate of $LiNbO_3$ doped with MgO, in which the domain inversion regions are formed periodically in a bulk form in the crystal, can be obtained, wherein the domain inversion regions are formed with a period falling within the range of 1.0 μm to 4.6 μm, and wherein the optical wavelength converting device is constituted such that, when a fundamental wave having a wavelength falling within the range of 640 nm to 940 nm impinges upon the optical wavelength converting device, the optical wavelength converting device radiates out a second harmonic having a wavelength falling within the range of 320 nm to 470 nm with the period of the domain inversion regions acting as the first-order period for the pseudo-phase matching.

As the optical wavelength converting device comprising a crystal of a Z-cut plate of $LiNbO_3$ doped with MgO, in which the domain inversion regions are formed periodically in a bulk form in the crystal, an optical wavelength converting device capable of radiating out a second harmonic having a wavelength of at most 470 nm has not heretofore been furnished. Since the absorption end of MgO—LN is 320 nm, it is practically impossible to radiate a second harmonic having a wavelength shorter than 320 nm from the optical wavelength converting device.

BRIEF DESCRIPTION OF THE DRAWINGS

FIGS. 1A to 1G are schematic views showing steps in a first embodiment of the process for producing an optical wavelength converting device in accordance with the present invention, FIG. 7 is a graph showing results of evaluation of periodicity of various bulk-form periodic domain inversion structures, each of which is formed in a ferroelectric substance by the utilization of a periodic electrode having an electrode line width A, the evaluation being made with respect to various different values of a period Λ of domain inversion regions and various different values of a duty ratio D (D=A/Λ).

DESCRIPTION OF THE PREFERRED EMBODIMENTS

The present invention will hereinbelow be described in further detail with reference to the accompanying drawings.

Figure 2:
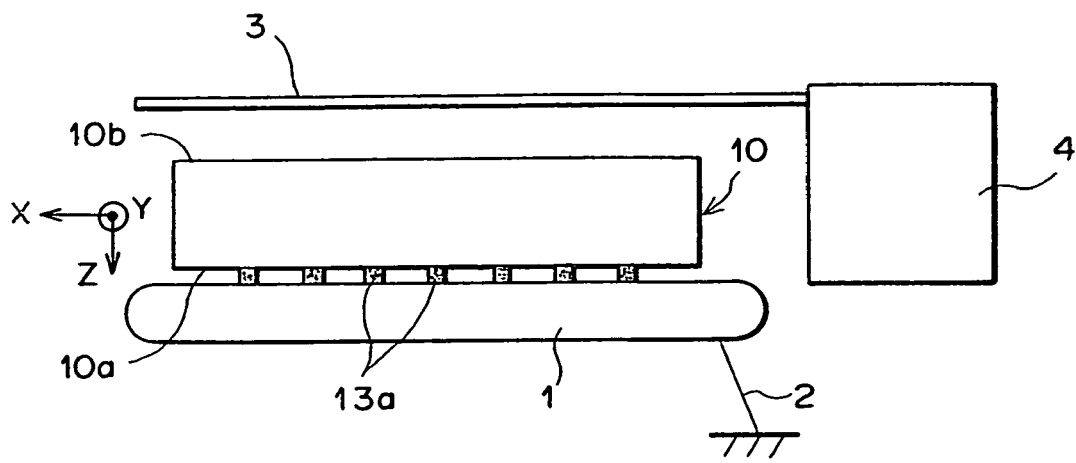
FIG. 2 is a schematic view showing a final step in the first embodiment of the process for producing an optical wavelength converting device in accordance with the present invention.

FIGS. 1A to 1G and FIG. 2 show steps of producing an optical wavelength converting device in a first embodiment of the process for producing an optical wavelength converting device in accordance with the present invention. FIGS. 1A to 1G show steps of forming a periodic electrode. FIG. 2 shows a step of inverting a spontaneous polarization (domain) of a ferroelectric substance by utilizing the periodic electrode having been formed with the steps shown in FIGS. 1A to 1G.

How the periodic electrode is formed will be described hereinbelow with reference to FIGS. 1A to 1G. In this embodiment, MgO—LN is employed as the ferroelectric substance having nonlinear optical effects. Firstly, as illustrated in FIG. 1A, a Z-cut MgO—LN plate 10 is prepared. The MgO—LN plate 10 is subjected to single polarization, and the two Z surfaces of the MgO—LN plate 10 are subjected to mirror polishing. The thickness of the MgO—LN plate 10 is thus set at 0.3 mm.

Thereafter, as illustrated in FIG. 1B, a resist layer 11 constituted of a photosensitive material is formed with a spin coating technique or a spraying technique on one surface (a+Z surface) 10a of the MgO—LN plate 10. The thickness of the resist layer 11 is set at a value approximately equal to or smaller than the oozing depth of near-field light, which oozing depth is ordinarily approximately equal to 50 nm.

Thereafter, as illustrated in FIG. 1C, a mask 12 for generating the near-field light in a periodic pattern is located such that the mask 12 is in close contact with the resist layer 11. The mask 12 comprises a mask substrate, which is constituted of a dielectric material, such as glass, and a lattice-like metal pattern, which has fine opening areas 12a, 12a, . . . and is formed on the mask substrate. In this embodiment, as will be clear from the explanation made later, each of the opening areas 12a, 12a, . . . of the metal pattern corresponds to one of electrode fingers of the periodic electrode to be formed, and each of metal areas 12b, 12b, corresponds to one of spaces between adjacent electrode fingers.

The mask 12 is located such that the opening areas 12a, 12a, . . . of the metal pattern stand side by side with respect to a X axis direction of the MgO—LN plate 10. Also, a period Λ of the metal pattern of the mask 12 is set at a value of 2.1 µm so as to act as the first-order period with respect to a wavelength of 380 nm of a second harmonic, which will be described later.

As illustrated in FIG. 1D, exposure light L, such as i-rays (having a wavelength of 365 nm), is then irradiated from the rear side of the mask 12 (i.e., from the upper side in FIG. 1D) to the mask 12. As a result, near-field light Ln oozes from the opening areas 12a, 12a, . . . of the metal pattern, and the resist layer 11 is exposed to the near-field light Ln.

Thereafter, the resist layer 11 is developed with a developing solution, and the portions of the resist layer 11, which were exposed to the near-field light Ln, become soluble in a developing solvent. In this manner, as illustrated in FIG. 1E, a positive type of periodic pattern 11a of the resist layer 11 is formed. Thereafter, as illustrated in FIG. 1F, the periodic pattern 11a is utilized as a mask, and chromium (Cr) 13 acting as an electrode material is deposited to a thickness of, for example, 20 nm by vacuum evaporation. As a result, Cr 13 is deposited on a one surface 10a of the MgO—LN plate 10 and only at positions corresponding to opening areas of the periodic pattern 11a of the resist layer 11. In lieu of Cr 13 being deposited by vacuum evaporation, tantalum (Ta) may be deposited by a sputtering technique, or the like.

Thereafter, as illustrated in FIG. 1G, the positive type of periodic pattern 11a of the resist layer 11 is removed by a lift-off technique, and a periodic electrode 13a having a period Λ of 2.1 µm is thereby formed on the one surface 10a of the MgO—LN plate 10. Since the mask 12 was located as described above such that the opening areas 12a, 12a, . . . of the metal pattern stand side by side with respect to the X axis direction of the MgO—LN plate 10, the electrode fingers constituting the periodic electrode 13a stand side by side with respect to the X axis direction of the MgO—LN plate 10.

In this embodiment, the width of each of the opening areas 12a, 12a, . . . of the metal pattern is set at a value of 0.2 µm, and therefore an electrode line width A of the periodic electrode 13a is set at a value of 0.2 µm. Accordingly, in this case, a duty ratio D (D=A/Λ) of the periodic electrode 13a is equal to 0.1. The value of the duty ratio D is lower than the value of 0.15 described above.

How the spontaneous polarization (domain) of the MgO—LN plate 10 is inverted by the utilization of the periodic electrode 13a will be described hereinbelow with reference to FIG. 2. As illustrated in FIG. 2, the MgO—LN plate 10 is located on an electrically conductive jig 1 such that the periodic electrode 13a is in contact with the electrically conductive jig 1. The electrically conductive jig 1 is formed from an electrically conductive material, such as copper or stainless steel, and is grounded through a grounding wire 2.

Also, a corona wire 3 is located above a −Z surface 10b of the MgO—LN plate 10, and a high voltage electric source 4 is connected to the corona wire 3. In this state, an electric field is applied through corona charge across the MgO—LN plate 10 by the utilization of the corona wire 3 and the high voltage electric source 4. At this time, the temperature of the MgO—LN plate 10 is set at 100° C., and the distance between the corona wire 3 and the MgO—LN plate 10 is set at 10 mm. In this state, an electric voltage of 5 kV is applied for one second from the high voltage electric source 4 via the corona wire 3. After the electric field has been applied, the periodic electrode 13a is removed from the MgO—LN plate 10.

A test was made for confirming the formation of domain inversion regions in the MgO—LN plate 10. In the test, the Y surface of the MgO—LN plate 10 was cut and polished. Thereafter, selective etching was performed by use of a mixed etching solution containing hydrofluoric acid and nitric acid. When the cross-section (the Y surface) of the MgO—LN plate 10 was observed, it was confirmed that periodic domain inversion regions were formed at positions corresponding to the positions of the electrode fingers of periodic electrode 13a and with the predetermined period corresponding to the period of the periodic electrode 13a. It was also confirmed that each of the periodic domain inversion regions was formed uniformly to extend from the −Z surface to the +Z surface and had uniform shape in the Y surface.

An optical wavelength converting device constituted of the MgO—LN plate 10 having been obtained in the manner described above will be described hereinbelow with reference to FIG. 3. In the manner described above, periodic domain inversion regions 21, 21, . . . are formed, which stand side by side with respect to the X axis direction of the MgO—LN plate 10. Thereafter, the +X surface and the −X surface of the MgO—LN plate 10 are polished. Non-reflection coating layers are then formed on the +X surface and the −X surface of the MgO—LN plate 10, and light passage surfaces 20a and 20b are thereby formed. In this manner, a bulk crystal type of optical wavelength converting device 20 shown in FIG. 3 is obtained.

Figure 3:
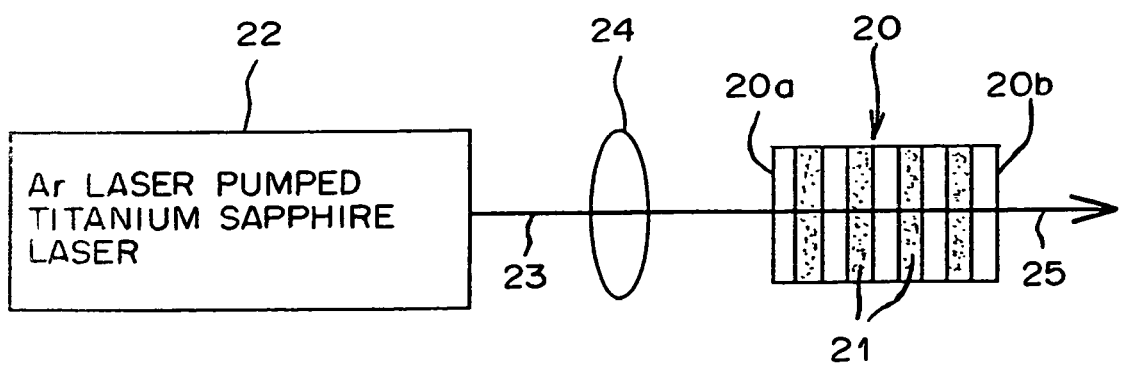
FIG. 3 is a side view showing a solid laser, in which an optical wavelength converting device obtained with the first embodiment of the process for producing an optical wavelength converting device in accordance with the present invention is employed.

As illustrated in FIG. 3, the bulk crystal type of optical wavelength converting device 20 having the periodic domain inversion structure is located on an output side of an Ar laser pumped titanium sapphire laser 22. A laser beam 23 is produced by the Ar laser pumped titanium sapphire laser 22, converged by a converging lens 24, and caused to impinge upon the bulk crystal type of optical wavelength converting device 20. In this case, such that phase matching may be effected with respect to the fundamental wave having a wavelength of 760 nm and the second harmonic having a wavelength of 380 nm, with dispersion due to variation of the refractive index of the MgO—LN for different wavelengths being taken into consideration, the period Λ of the periodic domain inversion regions 21, 21, . . . (which period is equal to the period of the periodic electrode 13a) is set at a value of 2.1 μm.

The Ar laser pumped titanium sapphire laser 22 produces the laser beam 23 having a wavelength of 760 nm as the fundamental wave. The output power of the Ar laser pumped titanium sapphire laser 22 is 400 mW. The laser beam 23 impinges upon the bulk crystal type of optical wavelength converting device 20 and is converted into a second harmonic 25 having a wavelength of 380 nm, which is one-half of the wavelength of the laser beam 23. The second harmonic 25 undergoes phase matching (i.e., the pseudo-phase matching) in the periodic domain inversion regions. As described above, the periodic domain inversion regions 21, 21, . . . have good periodicity. Therefore, the phase matching is effected appropriately, and the second harmonic 25 with power of 0.5 mW is obtained.

Steps in a second embodiment of the process for producing an optical wavelength converting device in accordance with the present invention will be described hereinbelow with reference to FIGS. 4A to 4F. In FIGS. 4A to 4F, similar elements are numbered with the same reference numerals with respect to FIGS. 1A to 1G.

Figure 4A:
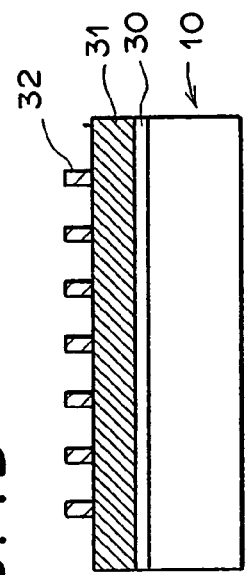
FIGS. 4A to 4F are schematic views showing steps in a second embodiment of the process for producing an optical wavelength converting device in accordance with the present invention.

Firstly, as illustrated in FIG. 4A, the MgO—LN plate 10, which is of the same type as that employed in the first embodiment described above, is prepared. A Cr layer 30 having a thickness of 20 nm, which acts as an electrode material layer, a first resist layer 31 constituted of an organic high-molecular weight material, and a second resist layer 32 constituted of a photosensitive material are formed in this order on the one surface (+Z surface) 10a of the MgO—LN plate 10 and with a spin coating technique or a spraying technique. The first resist layer 31 and the second resist layer 32 constitute a double-layered resist 33.

Figure 4B:
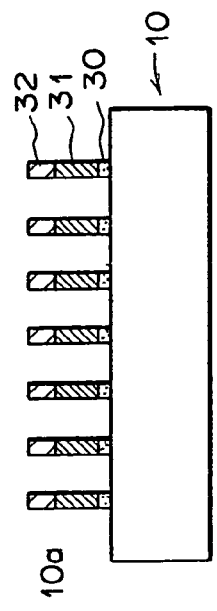

Thereafter, as illustrated in FIG. 4B, the mask 12, which is of the same type as that employed in the first embodiment described above, is located such that the mask 12 is in close contact with the double-layered resist 33. As in the first embodiment described above, the mask 12 having the metal areas 12b, 12b, . . . and the opening areas 12a, 12a, . . . of the metal pattern are located such that the opening areas 12a, 12a, . . . stand side by side with respect to the X axis direction of the MgO—LN plate 10. Also, as in the first embodiment described above, as will be clear from the explanation made later, each of the opening areas 12a, 12a, of the metal pattern corresponds to one of electrode fingers of the periodic electrode to be formed, and each of metal areas 12b, 12b, . . . corresponds to one of spaces between adjacent electrode fingers.

Figure 4C:
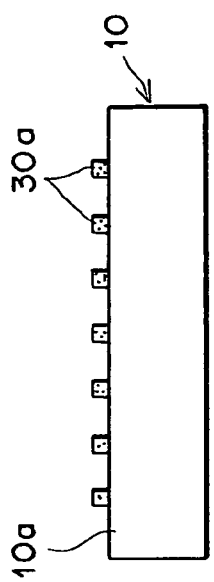

As illustrated in FIG. 4C, the exposure light L, such as i-rays (having a wavelength of 365 nm), is then irradiated from the rear side of the mask 12 (i.e., from the upper side in FIG. 4C) to the mask 12. As a result, the near-field light Ln oozes from the opening areas 12a, 12a, . . . of the metal pattern, and the second resist layer 32 is exposed to the near-field light Ln.

Figure 4D:
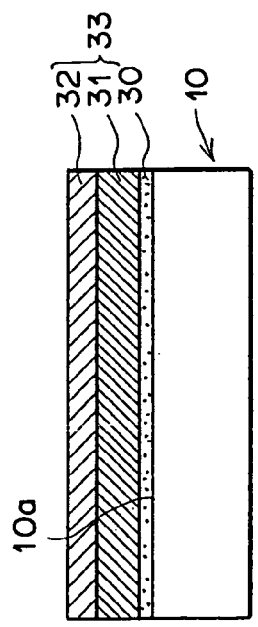
Figure 4E:
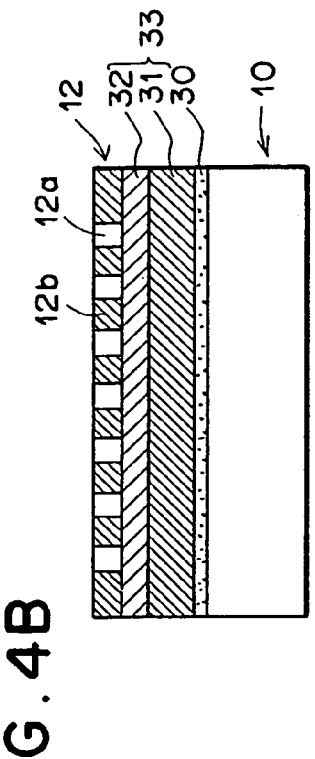

Thereafter, the second resist layer 32 is developed with a developing solution, and the portions of the second resist layer 32, which were exposed to the near-field light Ln, become soluble in a developing solvent. In this manner, as illustrated in FIG. 4D, a negative type of periodic pattern of the second resist layer 32 is formed. Thereafter, as illustrated in FIG. 4E, the periodic pattern of the second resist layer 32 is utilized as an etching mask, and the first resist layer 31 and the Cr layer 30 are subjected to dry etching with an $O_2$ plasma.

Figure 4F:
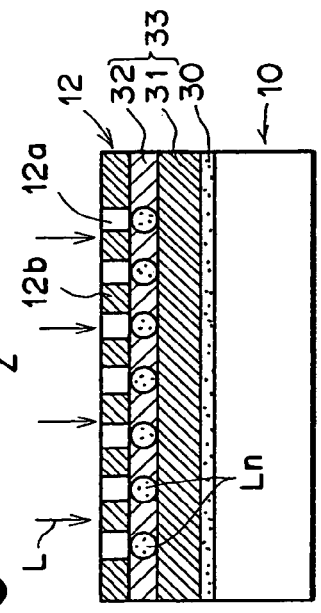

Thereafter, as illustrated in FIG. 4F, the second resist layer 32 and the first resist layer 31 are removed, and a periodic electrode 30a constituted of Cr is thereby formed on the one surface 10a of the MgO—LN plate 10. Since the mask 12 was located as described above such that the opening areas 12a, 12a, . . . of the metal pattern stand side by side with respect to the X axis direction of the MgO—LN plate 10, the electrode fingers constituting the periodic electrode 30a stand side by side with respect to the X axis direction of the MgO—LN plate 10.

The quality of the first resist layer 31 does not deteriorate due to exposure to light. Therefore, when the first resist layer 31 is dissolved, the first resist layer 31 and the second resist layer 32 can be removed easily. Alternatively, the first resist layer 31 and the second resist layer 32 may be peeled off with plasma ashing.

The photosensitive resist constituting the second resist layer 32 may be a positive type of resist having properties such that, when the resist is exposed to light, only the exposed portions of the resist becomes soluble in a developing solution. Also, the thickness of the second resist layer 32 should preferably be approximately identical with the oozing depth of the near-field light or shorter than the oozing depth of the near-field light.

Basically, as the organic high-molecular weight material constituting the first resist layer 31, one of various materials, which is capable of being etched with the $O_2$ plasma, may be employed.

In the manner described above, the periodic electrode 30a is formed on the one surface 10a of the MgO—LN plate 10. Thereafter, the spontaneous polarization (domain) of the MgO—LN plate 10 can be inverted by the utilization of the periodic electrode 30a. The domain inversion processing may be performed by using, for example, the apparatus shown in FIG. 2.

The first resist layer 31 and the second resist layer 32 will hereinbelow be described in more detail.

The first resist layer 31 is formed from a material capable of undergoing dry etching, particularly an organic high-molecular weight material. The first resist layer 31 should preferably be formed from a material, which does not form an intermediated mixed layer with the second resist layer 32 overlaid on the first resist layer 31. Therefore, the first resist layer 31 should preferably be formed from an organic high-molecular weight material, which does not dissolve in the solvent employed in the second resist layer 32. Alternatively, the first resist layer 31 should preferably be formed from an organic high-molecular weight material, which dissolves at normal temperatures in the solvent employed in the second resist layer 32, and which is capable of being converted with processing, such as heating, into a crosslinked network structure that substantially forms no intermediated mixed layer with the second resist layer 32.

As a technique for utilizing an organic high-molecular weight material, which is capable of being converted with processing, such as heating, into a crosslinked network structure, a technique may be employed, wherein a layer of a resist for i-rays or a resist for g-rays, which contains a novolak resin and a naphthoquinone diazide compound and is utilized for production of semiconductor devices, or the like, is applied to a necessary film thickness and is thereafter cured with heat treatment. Alternatively, a technique may be employed, wherein a layer of a negative type of resist, which contains an alkali-soluble resin, such as a novolak resin or a polyhydroxystyrene, an acid crosslinking agent, and a photo acid generating agent, is applied and is thereafter cured with entire-surface exposure to light. As another alternative, a technique may be employed, wherein a layer of a negative type of resist, which contains an alkali-soluble resin, such as a novolak resin or a polyhydroxystyrene, a polyfunctional monomer, and a photo-polymerization initiating agent or a thermal polymerization initiating agent, is applied and is thereafter cured with entire-surface exposure to light or with heat treatment.

The first resist layer 31 may also contain various additives for various purposes, such As furalene and its derivatives.

The second resist layer 32 is formed from a photosensitive resist material having properties such that, when the resist material is exposed to the near-field light, only the exposed portions of the resist material or only the unexposed portions of the resist material become soluble in a developing solvent, and the other portions of the resist material have dry etching resistance. The resist material should preferably be a material, which contains a compound having silicon atoms and in which the proportion of silicon in the solid content is equal to at least a predetermined value. In cases where the dry etching is performed with an oxygen-containing plasma, from the view point of oxygen plasma resistance, the proportion of silicon in the solid content in the resist material should preferably be comparatively high. However, ordinarily, if the proportion of silicon is markedly high, the pattern forming characteristics, edge roughness of the pattern or residues, and the like, will become bad. Therefore, the proportion of silicon in the solid content in the resist material should preferably be at least 1%, should more preferably fall within the range of 4% to 50%, and should most preferably fall within the range of 5% to 30%.

Examples of the resist materials, which may be employed for the second resist layer 32, include the resist materials described in Japanese Patent Nos. 2035509, 2094657, 2597163, 2606652, 2646241, 2646288, and 2646289; Japanese Unexamined Patent Publication Nos. 60(1985)-191245, 62(1987)-247350, 62(1987)-36661, 62(1987)-36662, 62(1987)-38452, 62(1987)-96526, 62(1987)-136638, 62(1987)-153853, 62(1987)-159141, 62(1987)-220949, 62(1987)-229136, 62(1987)-240954, 63(1988)-91654, 63(1988)-195649, 63(1988)-195650, 63(1988)-218948, 63(1988)-220241, 63(1988)-220242, 63(1988)-241542, 63(1988)-239440, 63(1988)-313149, 1(1989)-44933, 1(1989)-46746, 1(1989)-46747, 1(1989)-76046, 1(1989)-106042, 1(1989)-102550, 1(1989)-142720, 1(1989)-201653, 1(1989)-222254, 1(1989)-283555, 2(1990)-29652, 2(1990)-3054, 2(1990)-99954, 3(1991)-100553, 4(1992)-36754, 4(1992)-36755, 4(1992)-104252, 4(1992)-106549, 4(1992)-107460, 4(1992)-107562, 4(1992)-130324, 4(1992)-245248, 6(1994)-27670, 6(1994)-118651, 6(1994)-184311, 6(1994)-27671, 6(1994)-35199, 6(1994)-43655, 6(1994)-95385, 6(1994)-202338, 6(1994)-342209, 7(1995)-114188, 8(1996)-29987, 8(1996)-160620, 8(1996)-160621, 8(1996)-160623, 8(1996)-193167, and 10(1998)-319594; Japanese Patent Publication Nos. 6(1994)-7259, 6(1994)-42075, 6(1994)-56492, 6(1994)-79160, 6(1994)-84432, 7(1995)-27211, 7(1995)-60266, 7(1995)-69610, 7(1995)-99435, 7(1995)-111582, and 7(1995)-113772; U.S. Pat. Nos. 4,689,289 and 4,822,716; EP No. 229629A1; and Japanese Patent Application Nos. 10(1998)-354878, 11(1999)-31591 and 11(1999)-20224.

Examples of the resist materials, which may be employed for the second resist layer 32, include the resist materials described in U.S. Pat. Nos. 5,338,818, 5,422,223, 5,866,306, 5,385,804, 5,399,462, 5,238,773, 4,481,049, 4,689,289 and 4,822,716; and EP No. 229629A1. Further, the resist materials shown in the following formula, which are disclosed in Japanese Unexamined Patent Publication No. 7(1995)-114188, can be employed for the second resist layer 32.

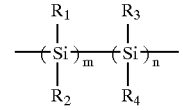

The photosensitive resin composition contains polysilane having a structure represented by the formula (in which each of R1–R4 is independently selected from the group consisting of optionally substituted aliphatic, alicyclic and aromatic hydrocarbon groups, and each of m and n is an integer), an optical radical generating agent and an oxidizing agent. Further, the resist materials shown in the following formulae, which are disclosed in Japanese Unexamined Patent Publication No. 11(1999)-20224, can be employed for the second resist layer 32.

The positive-type silicone-containing photosensitive composition comprising:
(a) a polymer which has a repeat unit expressed with the following general formula (I) and/or (II), and which is water-insoluble and alkali-soluble;

(b) a compound which generates an acid when subject to an activity beam of light or radiation; and
(c) a polymer which has in the side chain thereof a repeat unit expressed with the following general formula (III), the general formula (IV), or the general formula (V), and which exhibits properties that the solubility in an alkali developer increases due to the action of an acid.

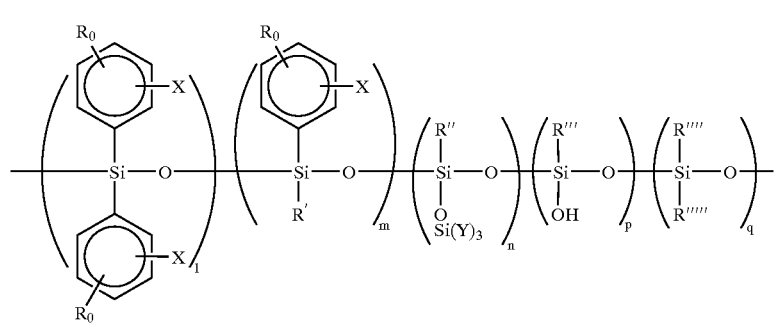

Formula I

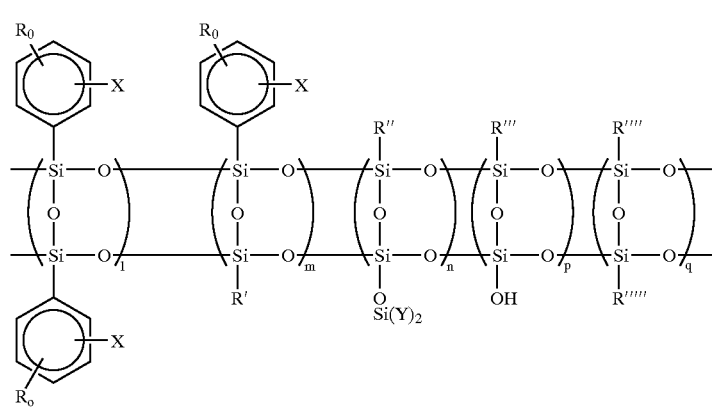

Formula II (X in formulae (I) and (II) is a group selected from the group consisting of —C(=O)—R group, —CH(OH)—R group, and a carboxyl group, and a plurality of X groups in the formula may be the same or different. R shows a hydrocarbon group which may have a hydrogen atom or a substitute therein. R'–R'''' may be the same or different, and is selected from the group consisting of an alkyl group, a cycloalkyl machine, an alkoxy group, an alkenyl group, an aralkyl group and a phenyl group all of which may have a hydroxyl group and/or a substituent. Y is an alkyl group, an alkoxy group or a siloxyl machine. R0 represents a group selected from the group consisting of an aliphatic hydrocarbon group and an aromatic hydrocarbon group which may have a hydrogen atom, a halogen atom and/or a substituent. Each of l, m, n and q is 0 or a positive integer, and p is a positive integer.)

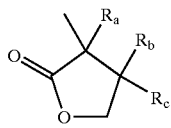

Formula III

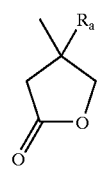

Formula IV

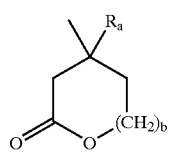

Formula V (Each of Ra, Rb and Rc in formulae (III)–(V) is independently a hydrocarbon group which may have a hydrogen atom and/or a substituent. s is an integer equal to 2 or greater.)

More specifically, the following pattern forming materials are preferable: pattern forming materials, which contain a water-insoluble, aqueous alkali-soluble, silicone-containing polymer and a naphthoquinone diazide compound and/or a diazo ketone compound; positive types of pattern forming materials, which contain a water-insoluble, aqueous alkali-soluble, silicone-containing polymer, a compound capable of generating an acid with exposure to active light rays or radiation, and a high- or low-molecular weight compound having a group decomposable with an acid and having properties such that the solubility in an aqueous alkali developing solution increases by the action of an acid; negative types of pattern forming materials, which contain a functional group-containing, water-insoluble, silicone-containing polymer having a group decomposable with an acid and having properties such that the solubility in an aqueous alkali developing solution increases by the action of an acid, a compound capable of generating an acid with exposure to active light rays or radiation, and a high- or low-molecular weight compound having a group crosslinkable with an acid and having properties such that the solubility in an aqueous alkali developing solution decreases by the action of an acid; negative types of pattern forming materials, which contain a water-insoluble, silicone-containing polymer having an olefinically unsaturated group and having properties such that the solubility in an aqueous alkali developing solution decreases through a polymerization reaction, and a compound capable of generating polymerization reaction initiating ability with exposure to active light rays or radiation; and negative types of pattern forming materials, which contain a water-insoluble, aqueous alkali-soluble, silicone-containing polymer, a compound capable of generating polymerization reaction initiating ability with exposure to active light rays or radiation, and a high- or low-molecular weight compound having an olefinically unsaturated group and having properties such that the solubility in an alkali developing solution decreases through a polymerization reaction.

Among the above-enumerated pattern forming materials, the pattern forming materials, which contain a water-insoluble, aqueous alkali-soluble, silicone-containing polymer, a compound capable of generating an acid with exposure to active light rays or radiation, and a high- or low-molecular weight compound having a group decomposable with an acid and having properties such that the solubility in an aqueous alkali developing solution increases by the action of an acid, are particularly preferable. Such pattern forming materials are described in detail in, for example, Japanese Patent Application No. 10(1998)-354878 with reference to the general formula, the explanation of the general formula, and examples. In the second embodiment of the process for producing an optical wavelength converting device in accordance with the present invention, such types of the pattern forming materials can be employed appropriately. Also, various additives capable of being added to the pattern forming materials are described in detail in Japanese Patent Application No. 10(1998)-354878. The additives can also be employed appropriately in the second embodiment of the process for producing an optical wavelength converting device in accordance with the present invention.

Figure 5:
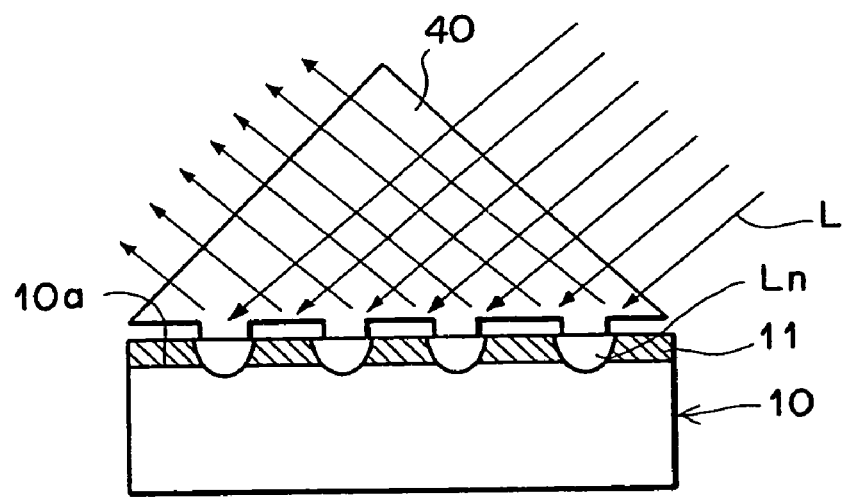
FIG. 5 is a schematic view showing a step in a third embodiment of the process for producing an optical wavelength converting device in accordance with the present invention.

A third embodiment of the process for producing an optical wavelength converting device in accordance with the present invention will be described hereinbelow with reference to FIG. 5. In the third embodiment, an optical stamp 40 is employed. The optical stamp 40 is constituted of a light-transmitting member, which is capable of transmitting the exposure light L and has a concavity-convexity pattern formed on one surface (the lower surface in FIG. 5), and the near-field light is capable of being radiated out from the concavity-convexity pattern. As illustrated in FIG. 5, the optical stamp 40 is located such that the one surface provided with the concavity-convexity pattern is in close contact with the resist layer 11. When the exposure light L is introduced into the optical stamp 40 and caused to undergo total reflection from the one surface of the optical stamp 40, the near-field light Ln is radiated out from the convex areas of the concavity-convexity pattern. In this manner, the resist layer 11 can be exposed to the near-field light Ln.

In the third embodiment, after the resist layer 11 has been exposed to the near-field light Ln, the development of the resist, the formation of the electrode, and the domain inversion processing may be performed, for example, in the same manner as that in the first embodiment described above. The optical stamp 40 has the advantages in that, since a metal is not used as in the aforesaid mask, the optical stamp 40 can be obtained at a low cost.

Figure 6:
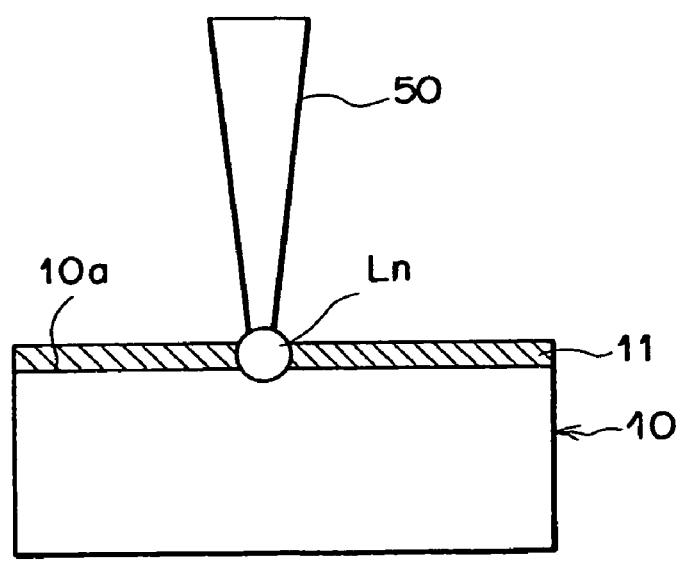
FIG. 6 is a schematic view showing a step in a fourth embodiment of the process for producing an optical wavelength converting device in accordance with the present invention.

A fourth embodiment of the process for producing an optical wavelength converting device in accordance with the present invention will be described hereinbelow with reference to FIG. 6. In the fourth embodiment, scanning exposure utilizing a probe 50 is performed. The probe 50 is provided with an opening having a diameter shorter than the wavelength of the exposure light and radiates out the near-field light Ln. The probe 50 is driven by scanning drive means (not shown) to scan in a periodic pattern mode on the resist layer 11. In this manner, the resist layer 11 is exposed in the periodic pattern to the near-field light Ln.

In the fourth embodiment, after the resist layer 11 has been exposed to the near-field light Ln, the development of the resist, the formation of the electrode, and the domain inversion processing may be performed, for example, in the same manner as that in the first embodiment described above.

The exposure system employed in the third embodiment or the fourth embodiment described above can also be employed in cases where the double-layered resist is employed as in the second embodiment described above.

In addition, all of the contents of Japanese Patent Application Nos. 11(1999)-241062 and 11(1999)-293802 are incorporated into this specification by reference.

What is claimed is:

1. A process for producing an optical wavelength converting device having a periodic domain inversion structure, in which a periodic electrode is formed on one surface of a single-polarized ferroelectric substance having nonlinear optical effects, and an electric field is applied across the ferroelectric substance by the utilization of the periodic electrode in order to set regions of the ferroelectric substance, which stand facing the periodic electrode, as local area limited domain inversion regions, the process comprising the steps of:

i) forming a first resist layer and a second resist layer in this order on the one surface of the ferroelectric substance, the first resist layer being removable by etching, the second resist layer being photosensitive and having properties such that, when light is irradiated to the second resist layer, only exposed areas of the second resist layer or only unexposed areas of the second resist layer become soluble in a developing solvent, ii) exposing the second resist layer to near-field light in a periodic pattern with means, which receives exposure light and produces the near-field light in the periodic pattern, iii) developing the second resist layer, which has been exposed to the near-field light, to form a periodic pattern in the second resist layer, iv) etching the first resist layer by utilizing the periodic pattern of the second resist layer as an etching mask to form a periodic pattern composed of the first resist layer and the second resist layer, and v) forming the periodic electrode on the one surface of the ferroelectric substance by utilizing the periodic pattern, which is composed of the first resist layer and the second resist layer, as a mask, the periodic electrode being formed at positions corresponding to opening areas of the mask, wherein the second resist layer has a film thickness of at most 100 nm.

2. A process for producing an optical wavelength converting device having a periodic domain inversion structure, in which a periodic electrode is formed on one surface of a single-polarized ferroelectric substance having nonlinear optical effects, and an electric field is applied across the ferroelectric substance by the utilization of the periodic electrode in order to set regions of the ferroelectric substance, which stand facing the periodic electrode, as local area limited domain inversion regions, the process comprising the steps of:

i) forming an electrode material layer on the one surface of the ferroelectric substance, ii) forming a first resist layer and a second resist layer in this order on the electrode material layer, the first resist layer being removable by etching, the second resist layer being photosensitive and having properties such that, when light is irradiated to the second resist layer, only exposed areas of the second resist layer or only unexposed areas of the second resist layer become soluble in a developing solvent, iii) exposing the second resist layer to near-field light in a periodic pattern with means, which receives exposure light and produces the near-field light in the periodic pattern, iv) developing the second resist layer, which has been exposed to the near-field light, to form a periodic pattern in the second resist layer, v) etching the first resist layer by utilizing the periodic pattern of the second resist layer as an etching mask to form a periodic pattern composed of the first resist layer and the second resist layer, and vi) etching the electrode material layer by utilizing the periodic pattern, which is composed of the first resist layer and the second resist layer, as an etching mask, such that portions of the electrode material layer at positions corresponding to opening areas of the mask are removed by the etching, whereby the periodic electrode is formed, wherein the second resist layer has a film thickness of at most 100 nm.

3. A process as defined in claim 1 or 2 wherein the exposure light has a wavelength falling within the range of 250 nm to 450 nm.

4. A process as defined in claim 1 or 2 wherein the means, which receives the exposure light and produces the near-field light in the periodic pattern, is a mask comprising a light-transmitting member, which is capable of transmitting the exposure light, and a metal pattern, which has opening areas and is formed on the light-transmitting member, the near-field light being radiated out from the metal pattern, and the mask comprising the light-transmitting member and the metal pattern is located such that the metal pattern is in close contact with the resist layer, which is laid bare and provided on or above the ferroelectric substance, or the metal pattern is located close to the resist layer, which is laid bare and provided on or above the ferroelectric substance, such that the near-field light reaches the resist layer, which is laid bare and provided on or above the ferroelectric substance, the exposure light being irradiated to the mask comprising the light-transmitting member and the metal pattern in this state.

5. A process as defined in claim 1 or 2 wherein the means, which receives the exposure light and produces the near-field light in the periodic pattern, is an optical stamp constituted of a light-transmitting member, which is capable of transmitting the exposure light and has a concavity-convexity pattern formed on one surface, the optical stamp operating such that, when the exposure light is guided from within the light-transmitting member to the one surface of the light-transmitting member and is caused to undergo total reflection, the near-field light in a pattern in accordance with the concavity-convexity pattern formed on the one surface of the light-transmitting member is radiated out, and the optical stamp is located such that the one surface of the optical stamp provided with the concavity-convexity pattern is in close contact with the resist layer, which is laid bare and provided on or above the ferroelectric substance, or the one surface of the optical stamp provided with the concavity-convexity pattern is located close to the resist layer, which is laid bare and provided on or above the ferroelectric substance, such that the near-field light reaches the resist layer, which is laid bare and provided on or above the ferroelectric substance, the exposure light being irradiated to the optical stamp in this state.

6. A process as defined in claim 1 or 2 wherein the means, which receives the exposure light and produces the near-field light in the periodic pattern, is a probe provided with an opening having a diameter shorter than a wavelength of the exposure light, the probe being caused to scan on the resist layer, which is laid bare and provided on or above the ferroelectric substance, the exposure light being irradiated in this state.

7. A process as defined in claim 1 or 2 wherein the ferroelectric substance is LiNbO3 doped with MgO.

8. A process as defined in claim 1 or 2 wherein the periodic electrode has an electrode line width of at most 0.3 $\mu$m.

9. The method according to claim 1 or 2, wherein a ratio (A/Λ) of an electrode line width of said periodic electrode (A) and a period of inversion regions of the periodic domain inversion structure (Λ) is less than 0.15.

10. The method according to claim 1 or 2, wherein a period of inversion regions of the periodic domain inversion structure falls in a range between approximately 1.0–4.6 micrometers.

11. The method according to claim 1 or 2, further comprising subjecting ferroelectric substance having the periodic electrode formed thereon to an electric field to form said periodic domain inversion structure.

* * * * *